United States Patent
de Laval

(10) Patent No.: US 6,400,312 B1
(45) Date of Patent: Jun. 4, 2002

(54) METHOD AND DEVICE FOR OBJECT DETECTION

(75) Inventor: Georg de Laval, Mölndal (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/575,856

(22) Filed: May 19, 2000

(30) Foreign Application Priority Data

May 21, 1999 (SE) .............................. 9901861

(51) Int. Cl.[7] .......................... G01S 13/04; G01S 13/88
(52) U.S. Cl. .......................... 342/148; 342/26; 342/27; 342/175; 342/195
(58) Field of Search .......................... 342/27, 28, 147, 342/148, 175, 192–197, 26

(56) References Cited

U.S. PATENT DOCUMENTS

| | | | |
|---|---|---|---|
| 3,404,396 A | * | 10/1968 | Buehler et al. ............... 342/26 |
| 4,222,265 A | * | 9/1980 | Ravussin .................. 342/26 X |
| 4,630,246 A | | 12/1986 | Folger et al. |
| 4,761,650 A | | 8/1988 | Masuda et al. |
| 5,122,805 A | | 6/1992 | Peterman et al. |
| 5,867,257 A | | 2/1999 | Rice et al. |

* cited by examiner

*Primary Examiner*—Bernarr E. Gregory
(74) *Attorney, Agent, or Firm*—Burns, Doane, Swecker & Mathis, L.L.P.

(57) ABSTRACT

Objects of interest are detected which are below the horizon and which emit or are the cause of pressure wave fronts. By emitting radar pulses that interact with the pressure wave fronts that appear above the radar horizon and then by analysis of the detected echo signals in the range bins, the existence of a pressure wave front can be determined. Then, it is evaluated if this pressure wave front indicates the presence of an object of interest or not. The transmitted radar pulses in relation to the detected echoes can be used for identifying the object of interest. The emitted radar pulses may have a wavelength which is a multiple of the expected wavelength of the pressure wave fronts.

23 Claims, 2 Drawing Sheets

METHOD AND DEVICE FOR OBJECT DETECTION

TECHNICAL FIELD

The present invention generally relates to a method of object detection and a device implementing the method, for example detection of the presence or non-presence of an aircraft, specifically the detention of low flying aircraft below the radar horizon.

BACKGROUND

The present invention generally relates to a method of Conventional radio frequency (r.f.) radar systems have been used to detect aircraft for a couple of decades. During this time different sophisticated methods have evolved to gather better and more information about detected aircraft, one such method is Doppler radar systems that can differentiate between ground clutter and a moving target Even with these advances, conventional radar systems possess certain natural limitations in the detection of low flying aircraft, especially aircraft or other objects of interest below the radar horizon There have been attempts to overcome these limitations by the use of acoustic detection methods. Such a system is described in U.S. Pat. No. 4,630,246. The system according to U.S. Pat. No. 4,530,246 relies on the use of microphones and seismic detectors to detect low flying aircraft. It can be considered a disadvantage that in order to cover a large detection area it is necessary to have to scatter a multitude of microphones and seismic detectors over the area in question.

There seems to be room for improvement in the manner of detecting low flying aircraft and other objects of interest.

SUMMARY

An object of the invention is to define a method and a device for efficiently detecting objects of interest which are below the radar horizon.

Another object of the invention is to define a method and a device, which is able to identify different objects of interest, which are below the radar horizon.

The aforementioned objects are achieved according to the invention by a method of detecting objects of interest, which are below the radar horizon. The method according to the invention can only detect objects of interest that emit or are the cause of pressure wave fronts. By emitting radar pulses that interact with the pressure wave fronts that appear above the radar horizon and then by analysis of the detected echo signals in the range bins, the existence of one or more pressure wave fronts can be determined. Thereafter it is evaluated if this or these pressure wave fronts indicate the presence of an object of interest or not. The transmitted radar pulses in relation to the detected echoes can be used for identifying the object of interest. The emitted radar pulses preferably have a wavelength, which is a multiple of the expected wavelength of the pressure wave fronts.

The aforementioned objects are also achieved by a method of detecting objects of interest, which are below the radar horizon. The method utilizes the expected presence of pressure wave fronts above the radar horizon, which pressure wave fronts are emitted from or are caused by the object of interest. The method comprises a number of steps. In a first step radar pulses are emitted in the estimated direction of the object of interest. Preferably the radar pulses are emitted into a volume where there is believed to be no physical objects, so that any returned echoes are not from bouncing of an object but due to an interaction with a pressure wave front. In a second step echoes from the estimated direction of the object of interest are detected. In a third step the existence of pressure wave fronts in the estimated direction of the object of interest are evaluated, in dependence of the detected echoes having interacted with pressure wave fronts. In a fourth step the presence of an object of interest below the radar horizon is evaluated in dependence on the evaluation of the existence of pressure wave fronts above the radar horizon.

The emitted radar pulses preferably have a wavelength being substantially a multiple of, and in some embodiments twice, the wavelength of the expected pressure wave frosts above the radar horizon. The emitted radar pulses can preferably either hare a fixed wavelength or have a wavelength that varies in the vicinity of a wavelength being a multiple of the wavelength or wavelengths of the expected pressure wave fronts above the radar horizon.

Advantageously in the step of evaluating the existence of pressure wave fronts, either only bins representing distances in the approximate range of the object of interest are used, only bins representing distances divergent from but in the approximate range of the object of interest are used, only bins representing distances corresponding to the radar horizon are used, or a suitable mix of the above, for example during different stages in the evaluation. The bins used can in some embodiments preferably be predetermined.

Advantageously the step of evaluating the existence of pressure wave fronts comprises a number of existence substeps. In a first existence substep a probability that there are pressure wave fronts is determined based on received echoes and their spread and magnitude in the bins. In a second existence substep it is determined if the probability is larger than a predetermined pressure wave front threshold value, and if it is determined that the probability is larger than the predetermined pressure wave front threshold value then it is evaluated that there are pressure wave fronts.

Further in some versions the step of evaluating the presence of an object of interest comprises a number of presence substeps. In a first presence substep a probability that there is an object of interest is determined based on the evaluation of the existence of pressure wave fronts, In a second presence substep it is determined if the probability is larger than a predetermined object threshold value, and if it is determined that the probability is larger than the predetermined object threshold value then it is evaluated that there is an object of interest below the radar horizon.

Advantageously the method further comprises the step of identifying the object of interest by analysis of the transmitted radar pulses in relation to the detected echoes.

One or more of the features of the above-described different methods according to the invention can be combined in any desired manner, as long as the features are not contradictory.

The aforementioned objects are also achieved according to the invention by a radar system arranged to detect an object of interest below the radar horizon. The radar system utilizes the expected presence of pressure wave fronts above the radar horizon, which pressure wave fronts are emitted from or caused by the object of interest. The radar system comprises a radar pulse transmitter, a radar pulse receiver, a signal processor and an evaluator. The radar pulse transmitter emits radar pulses in the estimated direction of the object of interest. Preferably the radar pulses are emitted into a volume where there is believed to be no physical objects, so that any returned echoes are not from bouncing of an object but due to an interaction with a pressure wave front. The radar pulse receiver detects echoes from the estimated direction of the object of interest. The signal processor evaluates the existence of pressure wave fronts in the estimated direction of the object of interest, in dependence of the detected echoes having interacted with pressure wave fronts. The evaluator evaluates the presence of an object of interest below the radar horizon in dependence on the signal processor's evaluation of the existence of pressure wave fronts above the radar horizon.

Preferably the radar pulse transmitter emits radar pulses having a wavelength being substantially a multiple of, and in some embodiments twice, the wavelength of the expected pressure wave fronts above the radar horizon. The radar pulse transmitter advantageously emits radar pulses having either a fixed wavelength, or a wavelength that varies in the vicinity of a wavelength being a multiple of the wavelengths or wavelengths of the expected pressure wave fronts above the radar horizon.

The signal processor in evaluating the existence of pressure wave fronts, preferably either only uses bins representing distances in the approximate range of the object of interest, only uses bins representing distances divergent from but in the approximate range of the object of interest, only uses bins representing distances corresponding to the radar horizon, or uses a suitable combination, for example in dependence on different stages in the evaluation. The range bins can preferably be predetermined.

Advantageously the signal processor further comprises means for determining a probability that there are pressure wave fronts based on received echoes and their spread and magnitude in the bins and means for determining if the probability is larger than a predetermined pressure waste front threshold value. If it is determined that the probability is larger than the predetermined pressure wave front threshold value then the signal processor evaluates that there are pressure wave fronts.

In some embodiments the evaluator further comprises means for determining a probability that there is an object of interest based on the evaluation of the existence of pressure wave fronts, and means for determining if the probability is larger than a predetermined object threshold value. If it is determined that the probability is larger than the predetermined object threshold value then the evaluator evaluates that there is an object of interest below the radar horizon.

In some versions the signal processor further comprises means for identifying the object of interest by analysis of the transmitted radar pulses in relation to the detected echoes.

The features of the above-described different embodiments of a system according to the invention can be combined in any desired manner, as long as no conflict occurs.

By providing a method for detecting objects below the radar horizon a plurality of advantages over prior art systems are obtained. A primary purpose of the invention is to detect, in a simple manner, low flying aircraft or other flying objects below the radar horizon by using a radar. According to the invention this is achieved primarily by detecting pressure wave fronts that appear above the radar horizon and which pressure wave fronts are either generated directly by the object, for example, having a noisy engine or is caused by, for example, the movement of the object. The characteristics of these pressure wave fronts can additionally be used for the identification of a detected object. Other advantages of thus invention will become apparent from the description.

BRIEF DESCRIPTION OF THE DRAWINGS

The invention will now be described in more detail for explanatory, and in no sense limiting, purposes, with reference to the following figures, in which.

DETAILED DESCRIPTION

In order to clarify the method and device according to the invention, some examples of its use will now be described in connection with FIGS. 1 and 2.

Figure 1:
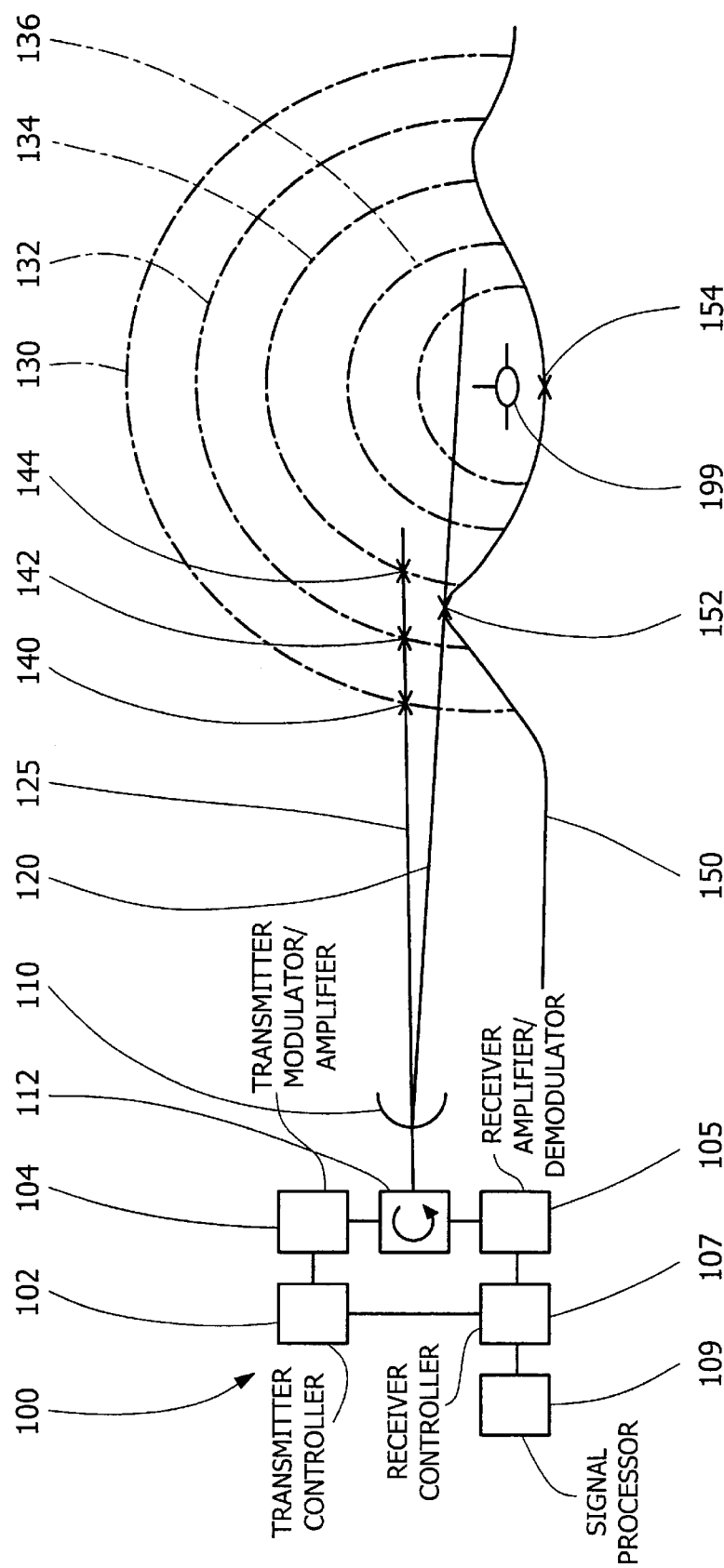
FIG. 1 shows radar system according to the invention and an example of its use.

FIG. 1 shows radar system 100 according to the invention and an example of its use. The radar system 100 preferably comprises an antenna 110 for transmission and reception radar signals, in other embodiments of the invention there can be separate antennas for transmission and reception. The radar system 100 further comprises a circulator 112, which is necessary due to the use of a single antenna 110, to keep a receiver amplifier/demodulator 105 separate from a transmitter high frequency modulator/amplifier 104. The transmitter is controlled by a transmitter controller 102 which determines what is transmitted and when it is transmitted. The transmitter controller 102 is closely associated with the receiver controller 107 which is kept informed of what is transmitted and when it is transmitted. The receiver further comprises a signal processor 109, which processes the received echoes, which echoes are put in range bins. There is preferably a feedback from the signal processor 109 to the receiver controller 107 back to the transmitter controller 102 on the success rate of the transmitted radar signals, i.e. the quality of the received echoes.

The radar system according to the invention will direct the antenna 110, or rather its beam, either electronically or physically, in dependence if the antenna 110 is electronically direction controlled or not, in a direction where it is believed that an object of interest is. The beam will be directed towards a volume above the believed location of an object of interest. The transmitter controller 102 will determine what will be transmitted with the help of the frequency modulator/amplifier 104, via the circulator 112, by means of the antenna 110. Any echoes will be received by the antenna 110, fed to the receiver amplifier/demodulator 105 via the circulator 112. The echoes are pre-processed by the receiver controller 107 in view of what was transmitted and when by information received from the transmitter controller 102, and then fed to a signal processor 109 for further processing. After the signal processor 109 is finished, possibly after an iterative process of sending alternative radar signals, the results are presented in an appropriate manner.

In certain situations, as is shown in FIG. 1 or due to the curvature of the earth, objects of interest 199 are below the radar horizon 152, 120 and thus invisible to the radar system 100 using normal radar techniques. Normal radar techniques detect echoes that originate from radar pulses that have bounced on objects If there are no echoes, then the radar system cannot detect any objects. Modern signal processing is able to separate received echoes into uninteresting echoes, which should be eliminated, and into interesting echoes that possibly come from objects of interest. If there is no line of sight from a radar antenna 110 to an object of interest 199, then there cannot originate any echoes from that object, the object is said to be below the radar horizon 152, 120. The line of sight to an object of interest will depend on the spatial locality (basically the height) of the radar antenna 110, the landscape 150, the curvature of the earth, the spatial locality (basically the height) of the object of interest 199, atmospheric conditions, and the distance. 154 from the radar antenna 110 to the object of interest. The radar horizon 152, i.e. the place beyond which the ground is no longer "visible" from the radar antenna 110, is dependent on the spatial locality (basically the height) of the radar antenna 110, the landscape 150, and the curvature of the earth. For the purposes of this application all objects that are not "visible" from a radar antenna and below the surrounding landscape, for example in a ravine, will also be referred to as being below the radar horizon.

Objects that are below the radar horizon are thus "invisible" to radar stations operating according to conventional techniques. To overcome these "blind" spots the radar system 100 according to the invention utilizes the finding that most, if not all, objects of interest emit sound 130, 132, 134, 136 or is the cause of sound 130, 132, 134, 136 being generated. For the purposes of this application sound is meant to include low frequency sound waves that are propagated by pressure wave fronts in air from 0 Hz to approximately 60 kHz. Sound can be emitted by an object due to engine noise, or an object can be the cause of waves in water that generate sound waves when they come into contact with a shore line. Whatever the direct source of the sound waves 130, 132, 134, 136, they can be detected by a radar system 100 according to this invention. The invention makes use of the fact that the sound waves 130, 132, 134, 136 propagate omnidirectionally, and most likely of all, up and above the radar horizon 120. According to the invention the sound waves, or rather pressure wave fronts, that appear above the radar horizon 120 can be intercepted 140, 142, 144 by a radar signal 125 and thus produce echoes that can be detected 105, 107 by the radar station 100, i.e. a radar signal directly interacts with pressure wave fronts. A radar signal/ wave that hits a pressure difference will partly reflect and partly transmit through the pressure difference, i.e. an echo will be produced. The radar station 100 will then signal process 109 the received echoes to evaluate if the echoes originate 140, 142, 144 from pressure wave fronts 130, 132, 134, 136, and specifically if the pressure wave fronts 130, 132, 134, 136 originate, either directly or indirectly from an object of interest 199. Preferably different objects of interest are pre-classified as to their sound-signature. Different objects will have different sound-signatures, i.e. the frequency spectrum will be different and possibly also change over time. By pre-classifying a number of different objects of interest and possibly also a number of generic virtual objects that possibly represent different classes of objects, it is possible to both evaluate if a detected sound pressure wave front is of interest at all or not and also to evaluate which object or class of object that is indirectly detected by the presence of the pressure wave front.

The strength of the resulting echo signals from the pressure wave front might be small as only a part of the electromagnetic energy is reflected. According to a preferred embodiment of the invention, to improve the signal to noise ratio to thereby improve the detectability of the pressure wave front, the transmitted radar signal is modifier so that echoes from several different individual pressure wave fronts are accumulated in the same range bin. This is made possible by modifying the transmitted radar signal 125 such that it comprises either radar pulses with a pulse repetition frequency (prf) whose wavelength equals a multiple of the wavelength of the pressure wave fronts, or a radar signal, pulses or rot, with a frequency having a wavelength that equals a multiple of the wavelength of the pressure wave fronts. As an example, an object emitting sound with a frequency of approximately 3 kHz, will result in a pressure wave front with a wavelength of approximately 0.11 m (assuming that the speed of sound in air is approximately 340 m,s). An electromagnetic radar wave or prf will then have to have a wavelength being a multiple of 0.11 m, which corresponds to a multiple of a frequency or prf of approximately 2.7 GHz (assuming that the speed of an electromagnetic wave in air is $3*10^8$ m/s).

In a special case the wavelength, or corresponding prf, of the transmitted radar signal is twice the wavelength of a searched for pressure wave front. The idea behind this is that when a last radar signal hits 140 an outermost pressure wave front 130, then a previous radar signal has hit 142 a next pressure wave front 132 and reflected/echoed/folded back to the same place as the last radar signal is located when it hits 140 the outermost pressure wave front 130. At the same time a still previous radar signal has hit 144 a still next pressure wave front 134 and reflected/echoed/folded back to the same place as the last radar is located when it hits 140 the outermost pressure wave front 130. Thus, in this example, when modifying the transmitted radar signal to have a wavelength twice, or a multiple, of the wavelength of the pressure wave fronts, there will be an accumulation of echoes arriving back to the antenna 110, which will increase the signal to noise ratio dramatically. The amplitude and spread in the range bins can thereafter be used to identify the pressure wave fronts. The signal processing can, for example, determine that there is a pressure wave front, but that the used modified transmitted radar signal is not a good match. The radar system according to the invention will then preferably go through and transmit a number of different modified radar signals, to thereby be able to evaluate which one or ones give the best response, and then also to evaluate the response in view of this. An identification can thus also be made.

To further improve the signal processing, preferably only certain ranges bins are taken into consideration so as not to muddle the signal processing with undesirable noises. In a known landscape 150 there will be certain hypotheses as to where the objects of interest 199 will be located or travel. As can be seen in FIG. 1 the pressure wave fronts 130, 132, 134, 136 form circles (actually spheres in three dimensions) around the object of interest, i.e. the source of these waves. It can be difficult to get something sensible from the range bins that represent a distance 154 of the object of interest, as it might be difficult to get any hits with the pressure wave fronts here, because they are basically parallel with the incoming radar signal 120, 125 and moving straight up. If interest is moved closer or further away than the predicted distance 154 of the object of interest 199, still in the direction of the believed momentary place of the object of interest 199, then the pressure wave fronts will be practically perpendicular to the radar signal 120, 125. The range bins that are preferably used for further signal processing are either the ones at a distance separate from the predicted distance 154, or the range bins which represent distances at or around the radar horizon 152, particularly if the radar horizon 152 is due to a peak in the landscape 150 as is shown in FIG. 1.

Figure 2:
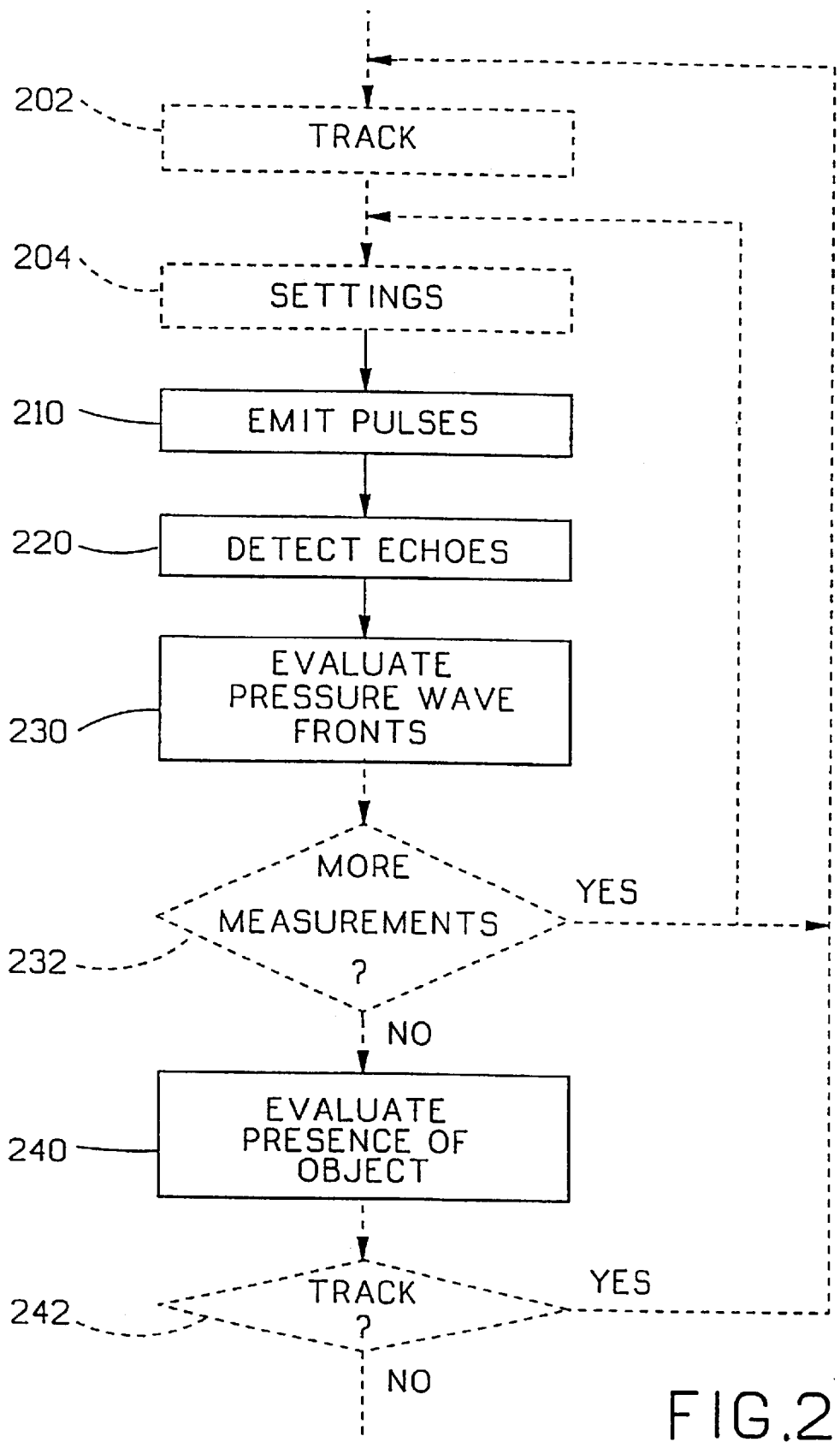
FIG. 2 shows a flow chart of a method according to the invention.

FIG. 2 shows a flow chart of a method according to the invention. The method according to the invention comprises a number of core steps 210, 220, 230, 240 and a number of optional steps 202, 204, 232, 242. In a first optional step 202 the radar beam is tracked to a desired three dimensional direction above a location of interest. Preferably a beam is pointed to a volume that is at least believed to be void of any physical objects so that echoes of physical objects do not interfere with any echoes from interactions with pressure wave fronts. Depending on the specific embodiment this can be done either electronically and/or by physically repainting the antenna. In a second optional step 204 the radar system is setup with appropriate configuration parameters regarding, for example, power level, frequency and duration. In a first core step 210 the radar emits radar pulses of an appropriate frequency and/or pulse repetition frequency The settings could be predetermined or set/adjusted in the second optional step 204. Thereafter in a second core step 220 the radar station will detect any echoes and perform any necessary preprocessing. In a third core step 230 the received echoes, if any, are evaluated to determine if there are any pressure wave fronts, i.e if the radar pulses have directly interacted with pressure wave fronts or not. Preferably a probability as to if there are any pressure wave fronts or not, is determined. Thereafter the determined probability is compared with a threshold, and if the probability is higher than the threshold, then it is evaluated that there are pressure wave fronts. Preferably only range bins that represent a distance that is in the vicinity of the believed distance of a possible object of interest are used. In a third optional step 232 it is determined if more measurements should be performed before any more evaluation/signal processing is done. The third optional step 232 can optionally in some embodiments be placed before the third core step 230, If it is determined that more measurements should be performed then the procedure can either continue at the first optional step 202 by redirecting the radar beam, or continue at the second optional step 204 and possibly adjust one or more settings. If it is determined that no more measurements should be performed then the procedure continues with the fourth core step 240, which would also have been the case if there was no third optional step 232. The fourth core step 240 evaluates if there is an object of interest by using the evaluation of the third core step 230 and further processing it. Preferably a probability as to if there is an object of interest or not, is determined. Thereafter the determined probability is compared with a threshold, and if the probability is higher than the threshold, then it is evaluated that there is an object of interest. Thereafter the procedure stops and awaits to be restarted, or it is determined in a fourth optional step if the radar should track a found object of interest or an area of interest by continuing with the first optional step 202, or if the procedure should stop for the moment.

The present invention can be put into apparatus-from either as pure hardware, as pure software or as a combination of hardware and software. If the method according to the invention is realized in the form of software, it can be completely independent or it can be one part of a larger program. The software can suitably be located in a general-purpose computer or in a dedicated computer.

As a summary, the invention can basically be described as a method, which provides an efficient manner of detecting objects below the radar horizon by the use of a radar, preferably with modified radar signals.

The invention is not limited to the embodiments described above but may be varied within the scope of the appended patent claims.

FIG. 1
100 a radar according to the invention
102 transmitter controller
104 high frequency modulator/amplifier
105 amplifier/demodulator
107 receiver controller
109 signal processor
110 antenna for transmission of and reception of echoes
112 circulator
120 beam for radar horizon of objects further away than point 152
125 beam
130 pressure front 1
132 pressure front 2
134 pressure front 3
135 pressure front 4
140 beam collision with pressure front 1
142 beam collision with pressure front 2
144 beam collision with pressure front 3
150 landscape surface
152 peak/distance defining radar horizon
154 distance to object of interest
199 object of interest, for example low flying aircraft
FIG. 2
202 optional: track, physically or electronically (re)point radar beam
204 optional: settings, what frequency and power should the pulses be transmitted with
210 emit pulses
220 detect echoes from the emitted pulses
230 evaluate the presence of pressure wave fronts
232 optional: more measurements?
240 evaluate the presence of an object
242 optional: track? object or another object

What is claimed is:

1. A method of detecting an object of interest below the radar horizon, wherein the method utilizes the expected presence of pressure wave fronts above a radar horizon, which pressure wave fronts are emitted from or caused by the object of interest, the method comprising the following steps:
   emitting radar pulses in an estimated direction of the object of interest;
   detecting echoes from the estimated direction of the object of interest;
   processing the detected echoes to determine whether the detected echoes have interacted with any pressure wave fronts in the estimated direction of the object of interest;
   determining a presence of the object of interest below the radar horizon in dependence on the processing of the detected echoes.

2. The method according to claim 1, wherein the emitted radar pulses have a wavelength being substantially a multiple of the wavelength of the expected pressure wave fronts above the radar horizon.

3. The method according to claim 2, wherein the emitted radar pulses have a wavelength being twice the wavelength of the expected pressure wave fronts above the radar horizon.

4. The method according to claim 1, wherein the emitted pulses have a fixed wavelength.

5. The method according to claim 1, wherein the emitted radar pulses have a wavelength that varies in the vicinity of a wavelength being a multiple of the wavelength or wavelengths of the expected pressure wave fronts above the radar horizon.

6. The method according to claim 1, wherein in the step of processing the detected echoes, only bins representing distances in the approximate range of the object of interest are used.

7. The method according to claim 1, wherein in the step of processing the detected echoes, only bins representing distances divergent from but in the approximate range of the object of interest are used.

8. The method according to claim 1, wherein in the step of processing the detected echoes, only bins representing distances corresponding to the radar horizon are used.

9. The method according to claim 1, wherein the step of processing the detected echoes comprises the steps of:
- determining a probability that there are pressure wave fronts based on received echoes and their spread and magnitude in the bins;
- determining if the probability is larger that a predetermined pressure wave front threshold value;
- and, if it is determined that the probability is larger than the predetermined pressure wave front threshold value, then it is determined that the detected echoes have interacted with pressure wave fronts.

10. The method according to claim 1, wherein the step of determining the presence of an object of interest comprises the steps of:
- determining a probability that there is an object of interest based on the processing of the detected echoes;
- determining if the probability is larger than a predetermined object threshold value;
- and, if it is determined that the probability is larger than the predetermined object threshold value, then it is determined that there is an object of interest below the radar horizon.

11. The method according to claim 1, wherein the method further comprises the step of:
- identifying the object of interest by analysis of the transmitted radar pulses in relation to the detected echoes.

12. A radar system that detects an object of interest below a radar horizon, wherein the radar system utilizes an expected presence of pressure wave fronts above the radar horizon, which pressure wave fronts are emitted from or caused by the object of interest, the radar system comprising:
- a radar pulse transmitter emitting radar pulses in the estimated direction of the object of interest;
- a radar pulse receiver detecting echoes from the estimated direction of the object of interest;
- a signal processor that processes the detected echoes to determine whether the detected echoes have interacted with any pressure wave fronts in the estimated direction of the object of interest;
- an analyzer that determines a presence of the object of interest below the radar horizon in dependence on the signal processor's processing of the detected echoes.

13. The radar system according to claim 12, wherein the radar pulse transmitter emits radar pulses having a wavelength being substantially a multiple of the wavelength of the expected pressure wave fronts above the radar horizon.

14. The radar system according to claim 13, wherein the radar pulse transmitter emits radar pulses having a wavelength being twice the wavelength of the expected pressure wave fronts above the radar horizon.

15. The radar system according to claim 12, wherein the radar pulse transmitter emits radar pulses having a fixed wavelength.

16. The radar system according to claim 12, wherein the radar pulse transmitter emits radar pulses having a wavelength that varies in the vicinity of a wavelength being a multiple of the wavelength or wavelengths of the expected pressure wave fronts above the radar horizon.

17. The radar system according to claim 12, wherein the signal processor in processing the detected echoes, only uses bins representing distances in the approximate range of the object of interest.

18. The radar system according to claim 12, wherein the signal processor in processing the detected echoes, only uses bins representing distances divergent from but in the 5 approximate range of the object of interest.

19. The radar system according to claim 12, wherein the signal processor in the processing the detected echoes, only uses bins representing distances corresponding to the radar horizon.

20. The radar system according to claim 12, wherein the
- means for determining if the probability is larger than a predetermined pressure wave front threshold value;
- and, if it is determined that the probability is larger than the predetermined pressure wave front threshold value, then the signal processor determines that the detected echoes have interacted with pressure wave fronts.

21. The radar system according to claim 12, wherein the analyzer further comprises:
- means for determining a probability that there is an object of interest based on the processing of the detected echoes;
- means for determining if the probability is larger than a predetermined object threshold value;
- and, if it is determined that the probability is larger than the predetermined object threshold value, then the analyzer determines that there is an object of interest below the radar horizon.

22. The radar system according to claim 12, wherein the signal processor further comprises:
- means for identifying the object of interest by analysis of the transmitted radar pulses in relation to the detected echoes.

23. The radar system according to claim 12, wherein the analyzer further comprises:
- means for identifying the object of interest by analysis of the transmitted radar pulses in relation to the detected echoes.

* * * * *